Figure 1:
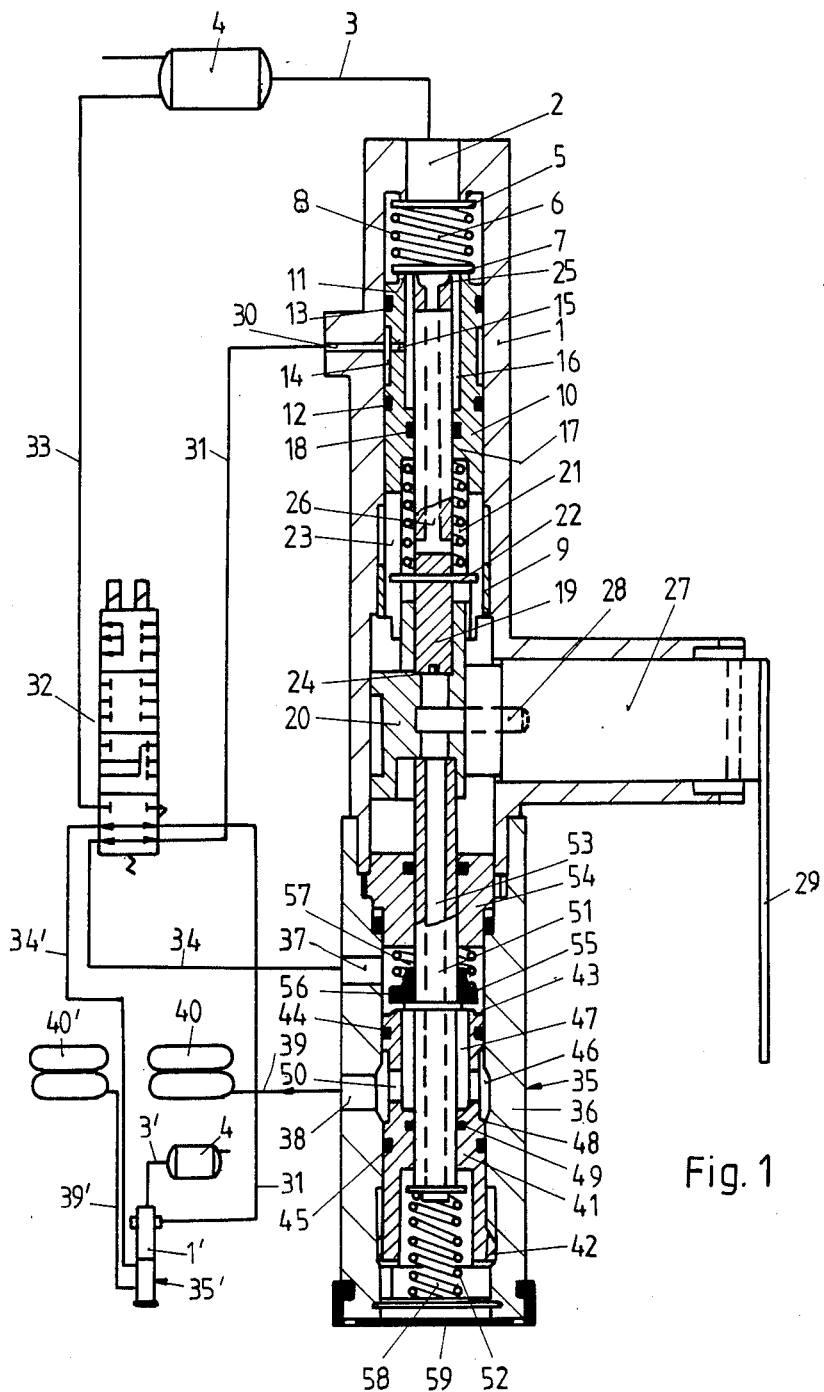

United States Patent [19]

Blanz

[11] Patent Number: 4,673,172

[45] Date of Patent: Jun. 16, 1987

[54] LEVELING VALVE WITH HEIGHT LIMIT

[75] Inventor: Roland Blanz, Heiligkreuzsteinach, Fed. Rep. of Germany

[73] Assignee: Graubremse GmbH, Heidelberg, Fed. Rep. of Germany

[21] Appl. No.: 808,834

[22] Filed: Dec. 13, 1985

[30] Foreign Application Priority Data

Dec. 21, 1984 [DE] Fed. Rep. of Germany ....... 3446810

[51] Int. Cl.[4] .......................... B60G 17/04; F16F 5/00
[52] U.S. Cl. ................................ 267/64.11; 280/714; 280/DIG. 1
[58] Field of Search .......................... 267/64.16–64.21, 267/64.11, 64.28; 180/41; 280/707, 714, 6 R, 683, 784, 705, 711–713, DIG. 1

[56] References Cited

U.S. PATENT DOCUMENTS

| | | |
|---|---|---|
| 3,145,032 | 8/1964 | Turek .................................. 280/714 |
| 3,183,935 | 5/1965 | Davies et al. .................... 280/714 X |
| 3,209,784 | 10/1965 | Schwartz .......................... 280/714 X |
| 3,635,460 | 1/1972 | Shilton et al. .................... 280/714 X |
| 3,933,368 | 1/1976 | Kellett .......................... 267/64.16 X |

FOREIGN PATENT DOCUMENTS

| | | |
|---|---|---|
| 2243103 | 3/1974 | Fed. Rep. of Germany . |
| 2318535 | 10/1974 | Fed. Rep. of Germany . |
| 2440800 | 3/1976 | Fed. Rep. of Germany . |
| 2516060 | 10/1976 | Fed. Rep. of Germany . |
| 2920507 | 12/1980 | Fed. Rep. of Germany . |
| 8005305 | 4/1981 | Netherlands .......................... 280/714 |

Primary Examiner—Douglas C. Butler
Attorney, Agent, or Firm—Neuman, Williams, Anderson & Olson

[57] ABSTRACT

The leveling valve for air-suspended vehicles is equipped with an intake valve (7,11) located between a connection (2) for a compressed air source and a connection (30) for a switching load valve (32), a discharge valve (7, 25) located between the connection (30) for the switching load valve (32) and a connection to atmosphere. It further comprises a control handle (29) which is turnable dependent on the distance between the vehicle frame and the corresponding vehicle axle and a non-return valve (35) which can also be controlled by the control handle (29) which is placed in series with and ahead of the air suspension bellows (40) and which interrupts further supply of compressed air to the air suspension bellows (40) in the Raise position of the switching load valve (32). The axis of the non-return valve (35) is provided in alignment with the axis of the leveling valve on the other side of the axis of the control handle (29). Both connections (37, 38) to the non-return valve (35) are arranged radially to the axis of the non-return valve. The valve body (56) or the seat (43) of the non-return valve are sealingly guided through the housing (36) and are located so that they can be axially adjusted and set.

6 Claims, 2 Drawing Figures

LEVELING VALVE WITH HEIGHT LIMIT

The invention relates to a combination valve having both leveling and height limiting sections for air-suspended vehicles. It comprises intake valve arranged between a connection (also referred to herein as a port) for a compressed air source and a connection for a switching load valve, a discharge valve located between the connection for the switching load valve and a connection to atmosphere, a control handle turnable dependent on the distance between the vehicle chassis and the corresponding vehicle axle and a non-return valve (also referred to herein as a closure valve) also controllable by the control handle which is switched in series with and ahead of the air suspension bellows and which interrupts the continued supply of compressed air to the air suspension bellows in the Raise position of the switching load valve. The use of such a height-limiting non-return valve requires the use of a switching load valve in the arrangement because only via such a switching load valve can the leveling valve be overridden to raise the vehicle body.

A leveling valve of the type described above is known from published patent application DE-OS No. 25 16 060. On the one hand, the leveling valve is connected to a compressed air reservoir. From the combined intake/discharge valve a line leads to the air suspension bellows via the switching load valve. The non-return valve is inserted into the line section between the switching load valve and the air suspension bellows. The non-return valve is also controlled by the turnable control handle of the leveling valve. It comprises a valve body and a valve seat, which are normally kept in the open position and cause a closing of the non-return valve only when a certain relative position of the control handle is exceeded when the vehicle chassis is raised. This is done via a control rod which is activated by a camshaft of the control lever. Due to a thread the control rod length is changeable and is thus configured adjustably and lockably with the control rod supporting the valve body of the non-return valve. Thus, the axis of the non-return valve is arranged parallel to the axis of the leveling valve, while the axis of the eccentric shaft of the control handle extends perpendicular to the two previously named axes. Thus, the respective different axes alternately stand perpendicular to each other. The connection to the line leading to the switching load valve is arranged axially, i.e. in the direction of the non-return valve axis, while the connection at the non-return valve leading to the air suspension bellows is configured radially. The disadvantage of this known leveling valve is the fact that to set the limit angle for activating the non-return valve the screw at the connection for the line leading to the switching load valve must be loosened. Thus, adjustment is only possible in a non-pressurized state. Further, due to the parallel arrangement of the axes of the leveling valve and non-return valve this leveling valve has a relatively wide construction and it is necessary to make the camshaft of the control handle comparatively long and equip it with a second cam area.

From published patent application DE-AS No. 23 18 535 a leveling valve is known which, however, does not have a non-return valve for height limitation, but a pilot valve via which a second large-volume discharge valve is controlled. In contrast to a non-return valve the pilot valve is normally closed and conversely opens only at a certain relative position of the control lever. A switching load valve is not provided here. Here, too, the pilot valve is arranged with its axis parallel to the axis of the leveling valve, while the camshaft axis of the control handle is perpendicular to it. The valve body of the pilot valve is extended by a rod which is sealingly guided through the housing and ends in a turning area in order to adjust the length of a control rod relative to the cam of the camshaft using a thread which control rod is also connected to the valve body. In this way it is possible to set a limit angle at which the pilot valve is supposed to open in order to also open the second discharge valve with has a large cross-section. This does not achieve a height limitation in the sense of reliably cutting off any further compressed air to the air suspension bellows. Only if the second discharge valve has indeed a very large discharge cross-section so that the compressed air enclosed in the air suspension bellows can flow off sufficiently quickly when a heavy container is suddenly lifted off the vehicle body, can an excessive expansion and a too far-reaching raise of the vehicle body due to the expanding air suspension bellows be avoided. Thus, in principle, a second discharge valve cannot work like a reliable height limit using a non-return valve.

It is the object of the invention to further develop a leveling valve with a height limit of the type described in the beginning in such a way that its non-return valve is settable to a desired operating angle of the control handle without having to depressurize the non-return valve. Further, the leveling valve is to be constructed comparatively more simply.

The invention achieves this by configuring the non-return valve with its axis aligned with the axis of the leveling valve on the other side of the control handle axis, by arranging the two connections to the non-return valve radially (also referred to herein as perpendicular) to the non-return valve axis and sealingly guiding the valve body and the valve seat of the non-return valve through the housing and locating it such that they can be axially adjusted and set. This allows adjustment under pressure since the valve body or the valve seat of the non-return valve are accessible without having first to release the pressure from the system. Suitably, the axis of the non-return valve is arranged not parallel to the axis of the leveling valve but aligned with it, on the other side, seen relative to the axis of the control handle camshaft. This means that the axis movement of the control rod of the leveling valve is also used, as it were, as a movement for the non-return valve control rod with the consequence that the control handle camshaft can be very short and otherwise only one cam surface is required to activate the leveling valve and the non-return valve.

The seat of the non-return valve can be located at an insert in the housing with a radial opening which leads to a connection for the air suspension bellows or the switching load valve and which is located in the housing so that it can be axially adjusted using a thread. Thus, the non-return valve can be switched in different ways. One, it can be arranged effectively between the switching load valve and the air suspension bellows. But it can also be placed in series with and ahead of the switching load valve where it is placed, as it were, between a compressed air reservoir and the switching load valve. It is understood that in the latter case the air suspension bellows are connected to the switching load valve.

The non-return valve can have a control rod which ends in a stop for a valve body which is sealingly and slidingly guided on the control rod and is pressed in the direction of the seat at the insert by a valve spring. The stop at the control rod can be a thickened end part or a ring-shaped projecting part. The valve body expediently consists of elastically flexible material, e.g. rubber, and is sealingly arranged on the outside diameter of the control rod. It works in conjunction with the valve seat at the insert.

The control rod can be guided through a sealed, stationary wall between which wall and the valve body as well as the valve seat of the non-returning valve an admission chamber is provided which is in continuous connection with the connection of the switching load valve. In this way the common housing between leveling valve and non-return valve can be divided and the stationary wall can be inserted when the two housing parts are bolted together.

In a preferred embodiment the insert can have two seals between which an exhaust chamber is formed which is in continuous connection with a connection to the air suspension bellows. Thus, the insert takes on a multiple function.

The control rod of the non-returning valve can be hollow and can be sealingly guided to the outside through the insert. On the one hand, this makes it possible to use the hollow control rod for ventilation purposes, i.e. to vent the discharge valve of the leveling valve, so that advantageously a vent opening at the lower end of the housing is used. It also permits adjustment of the hollow control rod through it and thus also adjustment of the closing position of the leveling valve through the non-return valve.

The invention is described further using two exemplified embodiments. It is shown in FIG. 1 a sectional view of the leveling valve with height limit in a first embodiment showing the essential connected components and FIG. 2 a sectional view through the leveling valve with height limit in a second embodiment.

The leveling valve with height limit shown in FIG. 1 has a housing 1 with an axial connection 2 at the top to which compressed air from a reservoir 4 is supplied via a line 3. Connection 2 leads to an intake chamber 6 in housing 1 through a check valve 5 which chamber is closed off at the other side by a valve body 7. The valve body of check valve 5 as well as valve body 7 are loaded by a joint spring 8. Below valve body 7 an adjustment body 10 is screwed into housing 1 using a thread 9 which adjustment body forms at its upper end an intake seat 11 and and is sealingly located in the housing with two seals 12 and 13. A rotary groove 14 is provided between seals 12 and 13. In the area of groove 14 adjustment body 10 has one or several radial openings. Otherwise, adjustment body 10 is hollow and has an axial hole 16 which reaches from the top to a wall 17 in whose area a seal 18 is provided. By turning adjustment body 10 versus housing 1 intake seat 11 is raised or lowered in a comparatively axial direction. Together with valve body 7 intake seat 11 forms an intake valve 7, 11.

A control rod 19 slides through adjustment body 10 and is sealingly guided through seal 18 which control rod is supported by a guide piece 20 which is also located in housing 1 and is moveable in an axial direction. This support is secured by a spring 21 which is located at adjustment body 10 on the one hand and also loads a transverse pin 22 which passes through control rod 19 and reaches into slots 23 of adjustment body 10. At its lower end control rod 19 has a notch 24 or any other different geometric shape for attaching a turning tool. Control rod 19 can be turned, however, without changing its axial position. However, by turning it adjustment body 10 is turned via transverse pin 22 so that its intake seat 11 can be turned axially. The control rod itself has a discharge seat at its upper end to which a channel 26 is connected. Together with discharge seat 25 valve body 7 forms discharge valve 7, 25.

In housing 1 of the leveling valve a camshaft 27 is turnably located to which camshaft guide piece 20 is coupled via eccentrically arranged follower 28. Camshaft 27 is turned by control handle 29. It is understood that in a common mode housing 1 can be linked to the vehicle body and control handle 29 to the corresponding vehicle axle. In this way height changes between vehicle body and vehicle axle result in a turning of control handle 29 and thus in raising or lowering discharge seat 25, so that either intake valve 7, 11 or discharge valve 7, 25 is opened.

At housing 1 a connection 30 for a line 31 is provided which leads to a switching load valve 32. Switching load valve 32 is also supplied with compressed air via a line 33 from reservoir 4. It has the four positions indicated which show the line connections. The top position corresponds to the Raise position. Then, the Stop position follows in which all lines are closed off. A further Lower position is provided. Finally, there is the Drive position in which the lines are connected or drawn in. From the switching load valve 32 a line 34 leads to a non-return valve 35 which is arranged with its axis in the elongation of the leveling valve axis. Non-return valve 35 has a housing 36 which can be screwed to housing 1 of the leveling valve. Two connections 37 and 38 are formed which are both arranged radially to the axis of non-return valve 35. From connection 38 a line 39 leads to air suspension bellows 40 of a first circuit. A second circuit is configured analogously. Reservoir 4 is drawn in once more. From it a line 3' leads analogously to housing 1' of a further leveling valve with height limit in the lower part of which another non-return valve 35' is located. From the leveling valve a line 31' leads to switching load valve 32. Analogously, from it a line 34' is provided to non-return valve 35'. Air suspension bellows 40' of the other circuit are connected via a line 39'.

An essential part of non-return valve 35 is an insert 41 which can be configured similar to or also identical with adjustment body 20. Insert 41 can be adjusted axially using a thread 42. It has a seat 43 at its upper end whose location relative to housing 36 or parts still to be described can be set using thread 42. Insert 41 has two seals 44 and 45 between which a circular groove 46 is provided which is in continuous connection with connection 38. Inset 41 has an axial bore hole 47 which ends at one wall with seal 49. A radial opening 50 connects bore hole 47 with groove 46.

Just as guide piece 20 supports a control rod 19 of the leveling valve towards the top, towards the bottom a further control rod 51, i.e. control rod 51 of non-return valve 35 is supported by a spring 52. Control rod 51 has an axial through-channel 53 which is sealingly guided through a stationary wall 54 and also through insert 41. Control rod 51 has a stop 55, e.g. in the form of a protruding bead, an inserted ring or similar which is used to activate a valve body 56 which sealingly surrounds control rod 51 and is supported at stationary wall 54 by a spring 57. Together with seat 43, valve body 56 constitutes the actual flow-through valve 43, 56 of non-return valve 35. Housing 36 of non-return valve 35 is open towards the bottom and is used for ventilation purposes. A vent opening 58 is covered with a flap valve 59. As can be seen, lifting flap valve 59 provides access not only to the adjustment of insert 41. In addition, it is also possible to bring a turning tool through channel 53 of control rod 51 up to notch 24 of control rod 19 to adjust the closing position of intake valve 7, 11 to discharge valve 7, 25. By turning insert 41 using thread 42 the axial position of seat 43 is changed and thus the start of the closing of flow-through valve 43, 56 which is normally open is set to a certain operating angle of control handle 29. This is the height limit. If this particular relative position is obtained when the desired permissible height has been reached valve 43, 56 closes, so that in the end further air supply to air suspension bellows 40 is interrupted.

The function of the leveling valve with height limit is as follows: the leveling valve with intake valve 7, 11 and discharge valve 7, 25 functions in the usual mode dependent on the respective load condition and driving behavior, so that this does not have to be described again. Actually, the leveling valve does in itself have a type of height limit because a discharge procedure via control handle 29 causes the vehicle body to rise and control handle 29 gets into a position in which intake valve 7, 11 remains closed and discharge valve 7, 25 is opened, so that with the switching load valve in the "Drive" position compressed air can escape from air suspension bellows 40, 40' into the atmosphere, namely via opened discharge valve 7, 25 and finally via vent opening 58. The normal functioning of the leveling valve thus already prevents the body from reaching an impermissible height relative to the vehicle axis.

If, however, switching load valve 32 is changed to the Raise position, lines 31 and 31' are closed off and lines 34 and 34' are connected with line 33, so that compressed air is sent to air suspension bellows 40 and 40' via the corresponding non-return valves 35 and 35'. Thus, the vehicle body is raised as intended. Flow-through valve 43, 56 of non-return valve 35 and, analogously, non-return valve 35' are open. If this process of raising the vehicle body continues to a range which corresponds to the permissible height, control handle 29 reaches a certain relative position in which a downward movement of control valve 51 takes along valve body 56 which then makes contact with stationary seat 43 of insert 41. This closes flow-through valve 43, 56 and thereby also line 39 to air supension bellows 30 and analogously line 39' to air suspension bellows 40, so that the air suspension bellows are protected against a further inflow of compressed air. The height position is thus limited and cannot be driven beyond this point. Conversely, valve body 56 is flexibly supported by spring 57, so that in the subsequent Lower position of switching load valve 32 lines 34 and 34' are vented with subsequent venting of air suspension bellows 40 and 40' since valve body 56 functions in the mode of an opening check valve. If switching load valve 32 is switched to the Stop position, all lines are closed off from each other, so that the height distance between vehicle body and vehicle axle reached at the time is maintained. Switching to the Drive position causes the leveling valve to operate again, and via control handle 29 the center position is selected corresponding to the load situation at the time.

Figure 2:
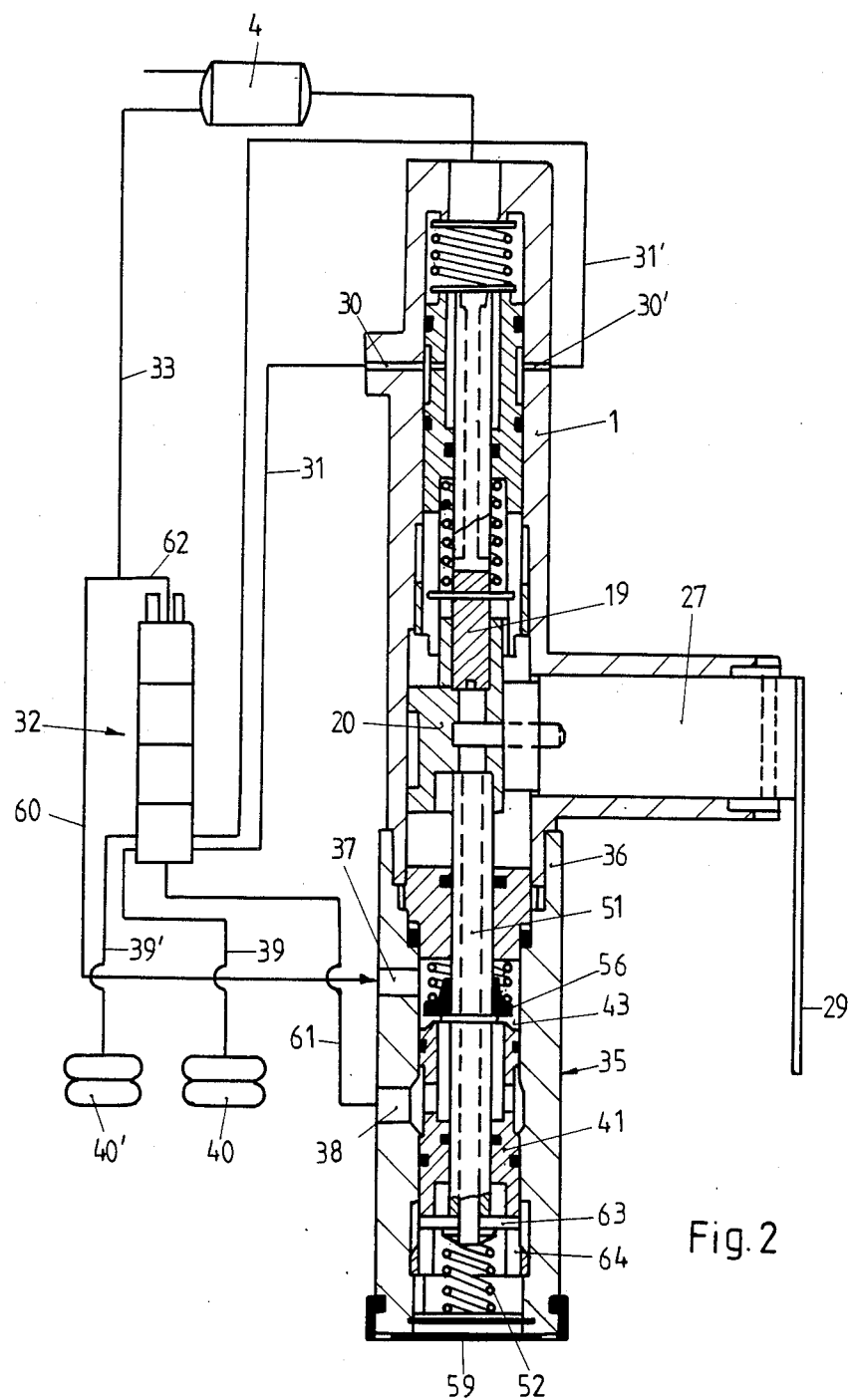

The exemplified embodiment of FIG. 2 is very similar in its design to FIG. 1, which is the reason why for similar or analogous parts similar reference numbers are used. However, only one leveling valve with height limit is used. Now, housing 1 has two connections 30 and 30', so that the two lines 31 and 31' lead to switching load valve 32. Here, lines 39 and 39' lead from switching load valve 32 directly to air suspension bellows 40 and 40' respectively. As is evident, non-return valve 35 is switched somewhat differently than in the exemplified embodiment of FIG. 1. As it were, non-return valve 35 is placed in series with and ahead of alternating load valve 32 in which a line 60 is connected to connection 37 which branches off from line 33 and thus supplies supply air from reservoir 4. This supply air is now sent via non-return valve 35 and reaches the switching load valve via a line 61, and from there, for instance in the Raise position, air suspension bellows 40 and 40' via lines 39 and 39'. Via line 62, switching load valve 32 has its own connection for supply air to activate its control pistons. Here, as it were, non-return valve 35 checks the supply of air from the reservoir to switching load valve 32, i.e. the air which is selected to raise the vehicle body via air suspension bellows 40 and 40'. The construction and other operation is analogous. A transverse pin 63, which engages slots 64 at insert 41 facilitates the turning of insert 41 and thus the adjustment of the height limit to the desired operating angle of control handle 29.

Having described the invention, what is claimed is:

1. Combination valve having leveling and height limiting sections for leveling and limiting the height of an air-suspended vehicle, the leveling section of said combined valve comprising:
   (a) a first housing (1) having an elongated axis,
   (b) an intake valve (7,11) supported within said first housing (1) and disposed to control pneumatic communication between a first port (2) in said first housing connectable to a compressed air source (4) and a second port (30) in said first housing connectable to an air-suspension bellows (40) via a switching load valve (32),
   (c) a discharge valve (7, 25) supported within said first housing (1) and disposed to control pneumatic communication between said second port (30) and an outlet to the atmosphere,
   (d) a control handle (27, 28, 29) supported within and extending from said first housing (1) and disposed whereby its angular position relative to said first housing (1) is responsive to the distance between the vehicle frame and the corresponding vehicle axle of the air-suspended vehicle, and
   (e) a first control rod (19) axially aligned in said first housing (1) and operatively connecting said control handle (27, 28, 29); and said intake valve (7, 11) and said discharge valve (7, 25) whereby to actuate the valves in a predetermined manner responsive to the angular movement of said control handle (27, 28, 29);

the height limiting section (35) of said combined valve comprising:
   (f) a second housing (36) having an elongated axis secured adjacent one extremity thereof, and in axial alignment with said first housing (1),
   (g) a closure valve (43, 56) axially aligned within said housing and having a valve body (56) and valve seat (43) adjustable relative to each other and disposed to control pneumatic communication between a fourth port (37) in said second housing (36) connectable to said switching load valve (32) and a fifth port (38) in said second housing (36) connectable to said air-suspension bellows (40), said fourth and fifth ports (37, 38) having axes perpendicular to the axis of said closure valve (43, 56), the closure valve being pneumatically sealed and axially accessible from the exterior of the other extermity of said second housing (36), permitting adjustment of the valve seat (43) relative to the valve body (56) without need for any dismantling of depressurization of the closure valve;

(h) a second control rod (51) axially aligned within said second housing (36) and operatively connecting said control handle (27, 28, 29) and said closure valve (43, 56) whereby to actuate the closure valve (43, 56) in a predetermined manner responsive to the angular position of said control handle (27, 28, 29).

2. The combined valve as set forth in claim 1 characterized in that valve seat (43) of the closure valve has an extended body portion (41) with threads (42) engaging a registering threaded portion of said second housing (36) whereby the axial position of the valve seat (43) relative to the valve body (56) within said second housing (36) may be adjusted.

3. The combined valve as set forth in claims 1 or 2 characterized in that the second control rod (51) of the height-limiting section (35) ends in a stop (55) for the valve body (56) which is guided sealingly and slidingly on the second control rod (51) and is pressed by a valve spring (57) in the direction towards the valve seat (43).

4. The combined valve as set forth in claims 1 or 2 characterized in that the second control rod (51) is guided through a sealed, stationary wall (54) within the second housing (36), between which wall and the valve body (56) and the valve seat (43) a chamber is provided which is continuously connected with said fourth port (37).

5. The combined valve as set forth in claim 2 characterized in that said extended body portion (41) has two seals (44, 45) between which an exhaust chamber is formed which is continuously connected with said fifth port (38).

6. The combined valve as set forth in claim 2 characterized in that said second rod (51) of said height-limiting section (35) is hollow and sealingly guided through said extended body portion (41) to an outlet to the atomsphere.

* * * * *